United States Patent
Cortes Soruco et al.

(10) Patent No.: US 12,424,123 B2
(45) Date of Patent: Sep. 23, 2025

(54) DEVICE FOR TRAINING AND DIRECT PRACTICE OF BREAST SELF-PALPATION TECHNIQUES

(71) Applicant: PONTIFICIA UNIVERSIDAD CATOLICA DE CHILE, Santiago (CL)

(72) Inventors: Josefa Cortes Soruco, Santiago (CL); Bernardita Figueroa Calmels, Santiago (CL)

(73) Assignee: PONTIFICIA UNIVERSIDAD CATOLICA DE CHILE, Santiago (CL)

( * ) Notice: Subject to any disclaimer, the term of this patent is extended or adjusted under 35 U.S.C. 154(b) by 748 days.

(21) Appl. No.: 17/787,562

(22) PCT Filed: Sep. 11, 2020

(86) PCT No.: PCT/CL2020/050103
§ 371 (c)(1),
(2) Date: Jun. 20, 2022

(87) PCT Pub. No.: WO2021/119861
PCT Pub. Date: Jun. 24, 2021

(65) Prior Publication Data
US 2022/0406223 A1  Dec. 22, 2022

(30) Foreign Application Priority Data
Dec. 18, 2019  (CL) .................................. 3721-2019

(51) Int. Cl.
G09B 23/30  (2006.01)
G09B 23/32  (2006.01)
G09B 23/34  (2006.01)

(52) U.S. Cl.
CPC .......... *G09B 23/303* (2013.01); *G09B 23/32* (2013.01); *G09B 23/34* (2013.01)

(58) Field of Classification Search
CPC ...... G09B 23/28; G09B 23/281; G09B 23/30; G09B 23/303
(Continued)

(56) References Cited

U.S. PATENT DOCUMENTS 4,815,977 A * 3/1989 Peters .................... A41D 1/215
  623/7
5,207,582 A * 5/1993 Michelson ................ B43L 3/00
  434/416
(Continued)

FOREIGN PATENT DOCUMENTS

JP  201913953 A  8/2019
WO  9425948 A1  11/1994

OTHER PUBLICATIONS

International Search Report for related International Application No. PCT/CL2020/050103; action dated Jun. 24, 2022; (5 pages).
(Continued)

*Primary Examiner* — Kurt Fernstrom
(74) *Attorney, Agent, or Firm* — K&L Gates LLP

(57) ABSTRACT

Device for training and direct practice of breast self-palpation techniques for the early detection of breast cancer comprising a container flexible body refillable with viscous fluid, a support and transfer platform connected to the body, means to simulate the type of abnormal tissue detectable within the body; fluid distributor element directly on the user's skin coming from the chamber and transfer means arranged towards the distributor element.

15 Claims, 13 Drawing Sheets

(58) Field of Classification Search
USPC .......................................................... 434/273
See application file for complete search history.

(56) References Cited

U.S. PATENT DOCUMENTS

| | | | | | |
|---|---|---|---|---|---|
| 5,913,686 | A * | 6/1999 | VanWinkle | ............ | G09B 23/30 |
| | | | | | 434/416 |
| 6,669,483 | B1 * | 12/2003 | Leight | ................... | G09B 23/30 |
| | | | | | 434/273 |
| 6,817,865 | B2 * | 11/2004 | Charbonneau | ......... | G09B 23/28 |
| | | | | | 434/273 |
| 6,854,976 | B1 * | 2/2005 | Suhr | ...................... | G09B 23/28 |
| | | | | | 434/273 |
| 7,419,376 | B2 * | 9/2008 | Sarvazyan | ............. | G09B 23/30 |
| | | | | | 434/273 |
| 8,678,831 | B2 * | 3/2014 | Trotta | ...................... | B29C 39/10 |
| | | | | | 434/273 |
| 2003/0219705 | A1 * | 11/2003 | Weissman | ............ | G09B 23/281 |
| | | | | | 434/267 |
| 2005/0079475 | A1 * | 4/2005 | Haque | .................... | G09B 23/30 |
| | | | | | 434/273 |
| 2006/0286525 | A1 * | 12/2006 | Haines | ................. | G09B 23/281 |
| | | | | | 434/267 |
| 2008/0289079 | A1 * | 11/2008 | Lewis | ................ | A41D 13/1245 |
| | | | | | 434/262 |
| 2011/0081636 | A1 * | 4/2011 | Wilkes | ................... | G09B 23/30 |
| | | | | | 434/267 |
| 2016/0180745 | A1 | 6/2016 | Trotta et al. | | |

OTHER PUBLICATIONS

Written Opinion for related International Application No. PCT/CL2020/050103; action dated Jun. 24, 2022; (10 pages).

* cited by examiner

DEVICE FOR TRAINING AND DIRECT PRACTICE OF BREAST SELF-PALPATION TECHNIQUES

CROSS-REFERENCE TO RELATED APPLICATIONS

This application is the National Stage filing under 35 U.S.C. 371 of International Application No. PCT/CL2020/050103, filed on Sep. 11, 2020, which claims the benefit of earlier filing date of and right of priority to Chile Application No. 3721-2019 filed on Dec. 18, 2019, the contents of which are all hereby incorporated by reference herein in their entirety.

FIELD

The disclosure that is the subject matter of this Patent of Disclosure application is applicable in the technical field of health and also in public health. More specifically, it is a device for training and direct practice of breast self-palpation techniques for early detection of breast cancer, which allows learning to distinguish abnormal tissue, allows its use at home, provides means to perform the self-examination itself in a real way and facilitates the formation of a habit of self-examination.

BACKGROUND

According to the World Health Organization, breast cancer is the most common cancer in women worldwide in both developed and developing countries, accounting for 16% of all female cancers.

And although this disease is generally considered a disease of the developed world, the majority of mortalities occur in developing, middle- and low-income countries, due to the fact that the diagnosis is made in very advanced stages. The 69% of deaths from breast cancer occur in developing countries.

Prevention strategies based on lifestyle changes are long-term strategies that cannot completely eliminate cases of breast cancer, so early detection is essential in developing countries to improve prognosis and survival of such cases by allowing adequate treatment at stages when curative treatment is still feasible.

From the detection strategies, mammography is the only screening method that has been found to be effective. Being a complex technique that requires a lot of resources to be executed, its application in low- and middle-income countries is restricted.

Breast self-examination as a detection strategy has shown efficacy for the empowerment of women regarding their health, as well as for the self-knowledge of their breasts that allow them to notice changes in them leading them to consult a doctor.

In order to raise awareness about breast health, giving value to early detection of cancer and improving its consequences, actions that require fewer resources and therefore would be appropriate in developing countries with low or medium levels of income, are those related to educational programs that go to the target population promoting the importance of early detection and risk factors.

The World Health Organization (WHO) indicates that regardless of the early detection method used, two essential aspects for success are having a well-organized and sustainable program that focuses on the appropriate population group and guarantees coordination, continuity and quality of interventions throughout the care continuum.

Then, the importance of breast self-examination would be an efficient measure by allowing women to know their body, become aware of their health and consult a doctor in the event of an anomaly, allowing them to obtain a clinical history and a clinical examination of the breast. In turn, to be successful, given the WHO recommendations, this process must be sustainable over time, guaranteeing continuity.

Given the importance of early detection, starting with breast self-examination, in the state of the art various devices can be found aimed at learning self-palpation and experimentation with simulators of breasts with tumors, so that trained people can recognize an anomaly. Some of the devices are aimed at training health personnel, others for patient training by specialist personnel, and some for self-learning.

In the case of massifying a breast self-examination technique and making it a daily and continuous action over time, the existing elements have not demonstrated the ability to be inserted into the daily life of a woman specially in the case of middle and low income populations, since it is difficult for them to acquire an element for exclusive use of learning and to have it hanging in the bathroom or stored in a drawer to practice from time to time and at the same time preparing to carry out their self-examination.

An example of this is seen in U.S. Pat. No. 4,001,951 by Wolfgang G. Fasse, 1977, which provides a training device comprised of a body of elastomeric material that has the shape of a breast, including an element similar to the nipple, which has internal elements that resemble one or more tumors made of plastic and filled with a flexible material, also comprising means that allow the internal volume to be modified to adjust or simulate different densities or firmness of the tissue. This device has the virtue of being made of low cost materials in order to be widely used, but it has the disadvantage of not being an element of daily use, since its exclusive function of training and self-training requires that its use be taught by a doctor and that finally is transformed into an object that requires a space and a time of use not ensuring its frequent use. It does not have any characteristics that allow it to adapt to the use of a woman's daily routine, either by incorporating some extra functionality associated with the moments in which women can perform self-examination, such as moments of hygiene or changing clothes, which forces their continuous visibility as an everyday element.

Something similar occurs with U.S. Pat. No. 4,867,686A by Goldstain M, 1989, which exhibits a breast model with tumors comprising an opaque elastomeric membrane that simulates the skin, a transparent support connected to the opaque membrane that generates a semi-hemispherical chamber between both and which contains media inside it that simulates breast tissue and tumors that cannot only be felt but also seen in their locations through the transparent membrane once the base is uncovered. It meets the objective of increasing the touch-vision sensory relationship to be able to distinguish even small tumors and have greater certainty in detection, but it fails in the objective of being an element that can be easily integrated into a daily routine, being visible daily at home and that allows the massification of self-examination.

The U.S. Pat. No. 4,134,218 of MAMMATHETICS Corporation of 1979, shows a model that is composed of a silicone rubber membrane that simulates the skin, an elastomeric filling medium such as silicone, which exhibits irregularities in order to simulate connective tissue and adiposities with other membranes containing simulated tumors made of other materials but that are connected to conductive elements that, when pressed, carry an electrical signal proportional to a computer system, which allows feedback during training. Having computational support makes it uneconomical and difficult to massify it, although it can be used to train health professionals in the palpation method to examine patients and can be particularly useful for training women in self-palpation at some specific center, it does not solve the problem of carrying out frequent and daily self-examination.

Patent Application US2004180314 of VERITE Inc, from 2004, shows an element that simulates a female breast in shape and appearance including a nipple and areola, made of some flexible material such as silicone and filled with a rubber sponge in which small pieces of materials such as plastic or metal simulating nodules are placed having a resistant and rigid body base larger than the diameter of the simulated breast in order to use part of the space to place an element such as a label with instructions of use and also leave an area available for use with a clamping mechanism at the top, particularly one that allows the assembly by means of suction to adhere it to the walls of a shower or in the bedroom. The disadvantage of this product as the previous ones, is that being an element for exclusive use for self-learning, it does not collaborate in the development of daily habits because it resembles a decorative object to be mounted on a wall, ensuring only frequent viewing and not touching and using it routinely.

It is possible to observe that in the state of the art the problem of generating a simulating element of a breast with cancerous tumors has been addressed in order to use it with the aim of training breast examination and women knowledge of how the sensation experienced by touch upon detection of a tumor should be. In some cases, the teaching method has also been addressed with feedback or instructions.

What has not been addressed is the problem of generating a habit in the activity of self-detection of breast cancer through these elements because by becoming a habit it allows women to know the characteristics of their anatomy and it is easier for them to recognize an anomaly.

The solutions aiming to achieve the widespread use of a training device have not been developed either, not only being based on lower cost but also on the fact that the device can be part of a daily act, that it can be part of the routine, such as hygiene, shower or change of clothes, which are usually appropriate when naked, these are private moments and do not require extra time to specifically perform the task of self-examination.

Organizations dedicated to the fight against breast cancer have recommended women as a strategy to feel their breasts when the skin is wet and slippery because it improves the sensitivity experienced to touch, the shower being the ideal place to obtain these conditions as well as being a moment of privacy. This slippery condition of the skin allows the fingers to slide continuously over the surface of the breast increasing the sensitivity to feel lumps or textures that are inside the breast or under the skin; thus, this ideal condition makes it possible to distinguish hard and fixed lumps, which are one of the signs to identify a cancerous tissue capable of being captured by simple touch.

Unlike benign lumps, cancerous tumors are tissues fixed in one position and with a special hardness greater than the rest of the breast tissue, where their shape and hardness remain relatively the same despite the pressure that can be exerted during breast palpation. Benign lumps tend to be soft, not normally fixed and despite having a limited shape they are fluid sacs, so they feel softer, deformable, and change position during palpation just like cysts.

It is also recommended to explore the breasts on different days of the hormonal cycle in order to know the behavior of the different regions during this cycle and to be able to differentiate relevant changes.

Finally, the regularity for becoming familiar with the behavior of the tissues and areas of the breast is also recommended, in order to go for a medical check-up when abnormalities are detected.

The foregoing highlights the need for a product that facilitates the learning of breast self-palpation at home and that is capable of facilitating the formation of a habit.

SUMMARY

The present disclosure relates to a training device for learning breast self-palpation techniques for detecting early-stage breast cancer, which allows learning to distinguish abnormal tissue, allows its use at home, provides means to perform the self-examination itself in a real way and facilitates the formation of a habit of self-examination.

One of the main objectives of the disclosure is to provide a device for domestic use as an accessory to carry out a routine activity such as taking a shower with simple technology without requiring a learning process supervised by professionals or specialized personnel.

Another objective is to provide a device that resembles real organs as much as possible, in this case, female breasts, so that the user can be identified with the product.

Still another objective is to provide a device that allows learning to identify abnormal tissue during palpation training, so that when the user performs it in a real way on herself she can recognize the presence of a tumor or nodule and can differentiate it from other non-malignant tissues, such as breast cysts.

Another important objective for the present disclosure is to provide a device capable of allowing not only training in self-palpation but also participating as a direct practice accessory to perform a real self-examination on a daily basis.

Thus, the present disclosure proposes a training device for learning breast self-palpation techniques for early detection of breast cancer, comprising a container flexible body in the shape of a breast fillable with a viscous fluid, a support and transfer platform connected to the flexible body to define an interior chamber, means to simulate at least one type of abnormal tissue detectable within the flexible container body; a fluid distributor element directly on the user's skin coming from the chamber and transfer means arranged on the platform that allow the transfer of said fluid from the chamber to the distributor element.

The container body has the shape and size of a breast normally semi-spherical in shape, it comprises a lower edge with an inner perimeter projection in the shape of a flat ring. It is made of silicone elastomer with characteristics of high elasticity and resistance, which allows the body to be repeatedly filled and subjected to manipulations during its use in training, without suffering permanent deformations; when filled with the viscous fluid, a different density can be achieved depending on the amount of fluid that is placed.

The container body has an upper circular opening for access to fill the inner chamber with the viscous fluid and which comprises an anti-leak closure element that simulates the shape of a nipple. Said anti-leak closure is made of a harder material than the flexible container but is equally elastomeric and comprises a central area of the stem with a diameter greater than the circular access opening, so that the opening is adjusted around the stem in the sealing position, it comprises a rounded lower projection with a diameter even larger than the stem that prevents the closure element from coming out easily, and an upper projection with a diameter greater than the diameter of the lower projection.

In an alternative embodiment, the upper projection of the anti-leak closure element is slightly curved downwards describing a curved truncated cone shape while the lower projection also describes a convex curvature, at least on its upper face. These curvatures show a better performance in the adaptation of the closure element to the convex curvature of the flexible body.

The aforementioned support and transfer platform comprises a solid body with means to retain the flexible body around its perimeter edge, it comprises an upper surface that remains inside the flexible body and is the support for the means to simulate at least one abnormal tissue while also comprising a lower support surface for the distributor element.

The solid body is preferably flat cylindrical in shape with the upper surface and the lower surface substantially parallel to one another, with a straight outer mantle; where this body being solid and rather hard, acts as a casing and at the same time is the part where users take the device safely.

Said means for retaining the flexible body comprise a perimeter groove made around the entire perimeter of the mantle, it has a depth that matches the width and thickness of the perimeter projection of the lower edge of the container flexible body where said perimeter projection is inserted into the groove and fixed with a suitable silicone adhesive. This joint is then covered by an outer piece in the form of a perimeter seal ring.

Said perimeter seal ring has a stepped inner face that joins the outside of the outer mantle of the solid body and retains the lower edge of the flexible body with the projection inserted in the groove achieving a sealed joint that prevents the flexible body from coming out from the platform or that there is fluid leakage through said joints.

The means to simulate a type of abnormal tissue comprise at least one smaller body with a shape and size similar to a tumor, made of a material that is harder and stronger than the material of the flexible container body, so that the user can distinguish and feel it through the flexible body and the viscous fluid. The tumor or tumors are fixedly located on the upper surface of the platform and preferably when there are more than one they are arranged in different parts of the upper surface of the platform.

The means to simulate a type of abnormal tissue may also include simulations of benign formations, such as cysts of different sizes which are a smaller body of defined shape usually spheroid and ovoid made of a material similar to that of the container flexible bodyfor they must appear soft and not be fixed within the chamber of the flexible container body.

The viscous fluid distributing element that spreads directly on the user's skin comprises a body of absorbent and spongy material, preferably cylindrical in shape and not very high with a flat exterior face with a rounded edge and a flat interior face with a straight edge which is joined by its inner flat face to the lower surface of the platform, so that the distributor element has a diameter matching with the diameter of the platform. Preferably, this distributor element is a soft sponge, which allows the viscous fluid to be spread over the skin of the breast and generate a slight foam.

As can be seen, on one side of the platform there is the container flexible body of the viscous fluid and on the opposite side there is the distributor element of said fluid on the skin of the breast; where the fluid arrives from the container flexible body to the distributor element through the transfer means comprising at least one through opening that communicates the upper surface of the platform with the inner face of the distributor element. This or these through openings can be of a small diameter, such as 1.5 millimeters which ensure a slow passage of the fluid.

In an alternative embodiment, the through openings can have a temporary closure means that stops the flow of fluid towards the distributor element.

In operation, the device is filled with the viscous fluid, such as liquid soap, filling the inner chamber of the flexible container to achieve a breast-like density; the fluid is integrated through the upper opening of the flexible body which must then be closed by the anti-leak closure element that ensures a sealed condition of the inner chamber; the user ideally performs the operation during the shower and considering that she is informed about how to palpate the simulation breast she begins to explore it with the fingers of one hand, while with the other hand she can serve as a support for the device to ensure its position. Once she has completed training in the simulation breast, where she has learned what a tumor might feel like, she proceeds to perform the real self-examination on her own breasts, for which the same pressure exerted by the fingers on the flexible body makes that the fluid (liquid soap) is transferred from the chamber to the distributor element formed by a sponge through the transfer opening(s) present in the platform of the device.

With this, the user can spread an adequate amount of fluid on her skin, to allow her fingers to slide following the same technique learned with the simulation breast. The amount of fluid (liquid soap) that is spread on the breast must be a discreet amount, since an excess of material generates rather a film of separation between the skin and the fingers preventing a necessary level of sensitivity; on the other hand, a very small amount of fluid prevents the continuous sliding of the fingers on the skin and can even generate disruptions in the progress.

The disclosure also includes a training kit to teach and learn breast self-examination techniques for early detection of breast cancer which includes the just described device and a package containing the device inside which shows information with instructions for use, filling of the flexible body, palpation training with the device and instructions on how to perform the self-palpation exam on the user's own breasts using the same device.

This packaging, which is part of the kit includes an inner face where the information is arranged; it allows the kit to be opened and unfolded safely without breaking its faces, so the vertical edges of the package are of the type folded in bellows and the means in which it closes is only with snap-in flaps without the use of adhesives. This packaging can be made of laminated cardboard with a waterproof film that protects it against moisture.

The presence of this liquid soap-type viscous fluid distributor element directly on the user's skin allows this device turn from being a mere simulator device to learn palpation into a device that also facilitates self-examination in a real way and in an adequate, intimate and routine context, since the same fluid that is used to fill the flexible body chamber in the shape of a breast to simulate its shape and density, is the one that is used as a viscous medium spread on the skin through the sponge to perform a self-examination during the shower.

Additionally, this package can also include graphic information in the form of a Tillable table or a calendar where the user can mark the date on which the breast palpation self-examination has been carried out or also to incorporate the dates of her menstrual period, so that these data may be useful to establish some relationship with the changes that the user detects in her breasts depending on the part of the menstrual period in which she is.

With this, the device can be used routinely in the shower, and not only be used as a device to train or learn self-palpation. And by constituting this device as part of a kit with a package that brings pertinent information, it can be distributed as a mass prevention measure and as a prevention strategy in public health, facilitating the formation of a self-examination habit that can be carried out at household level and include it as part of a routine, such as in the shower.

BRIEF DESCRIPTION OF THE DRAWINGS

In order to carry out the objectives, the disclosure may be performed as in the illustration of the accompanying drawings; however, the drawings are only illustrative and do not limit the scope of the disclosure, and may acquire multiple embodiments as long as they are under a common inventive concept. Thus, a detailed description of the disclosure will be carried out together with the Figures that are an integral part of this presentation, where.

DETAILED DESCRIPTION

The disclosure relates to a device for training and direct practice of breast self-examination techniques for early detection of breast cancer which allows its use at home, provides means to perform self-examination in a real way and facilitates the formation of a self-examination habit.

Figure 1:
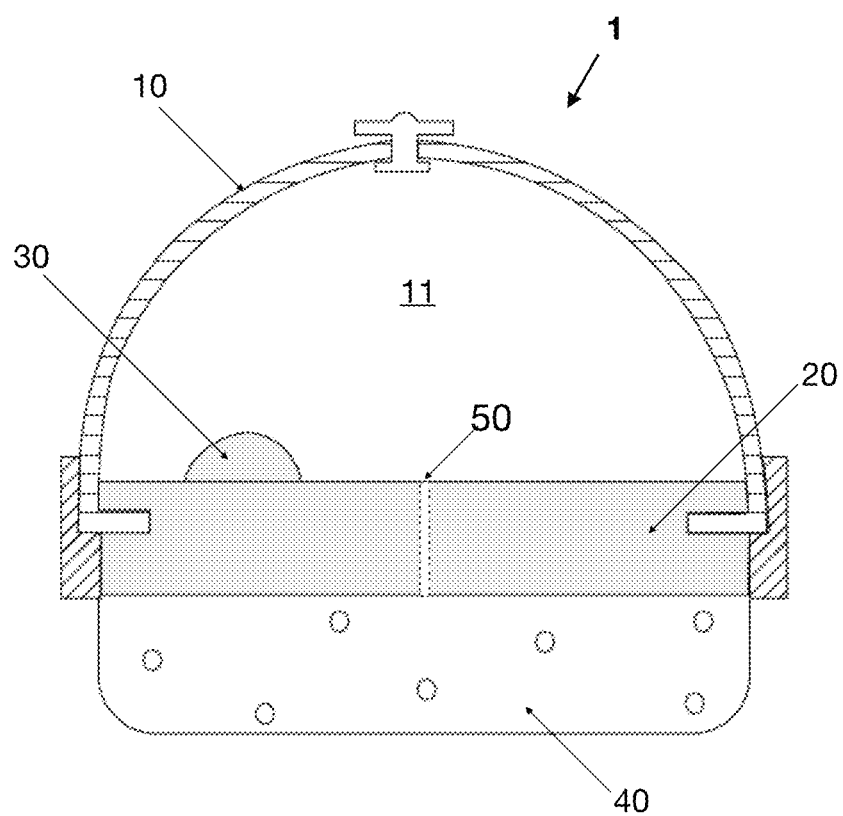
FIG. 1 shows a sectional front elevation of the entire device.

As illustrated in FIG. 1, the device (1) comprises a container flexible body (10) refillable with a viscous fluid; a support and transfer platform (20) connected to the flexible body (10) to define an inner chamber (11) where the viscous fluid is contained; means for simulating (30) at least one type of detectable abnormal tissue within the container flexible body (10); a distributor element (40) of the fluid directly on the user's skin coming from the chamber (11); and transfer means (50) arranged on the platform (20) that allow the transfer of said fluid from the chamber (11) to the distributor element (40).

Figure 2:
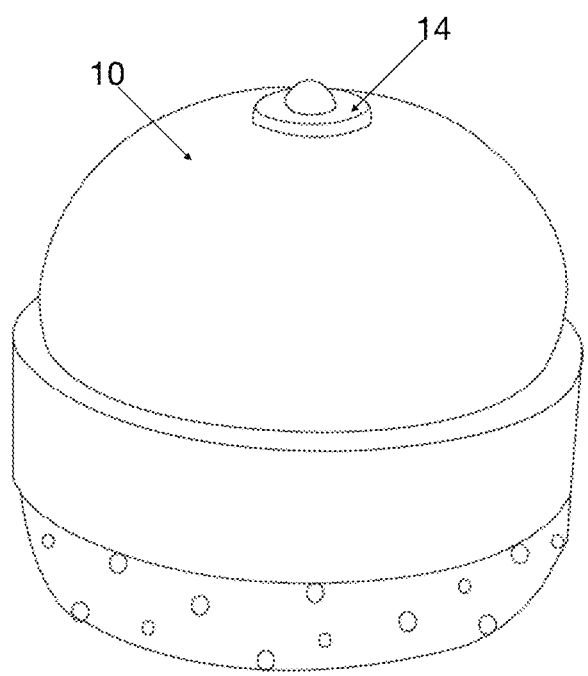
FIG. 2 shows a top isometric view of the device.

As seen in FIG. 2, the container flexible body (10) has the shape and size of a breast with an anti-leak closure element (14) that simulates the shape of a nipple.

Figure 3:
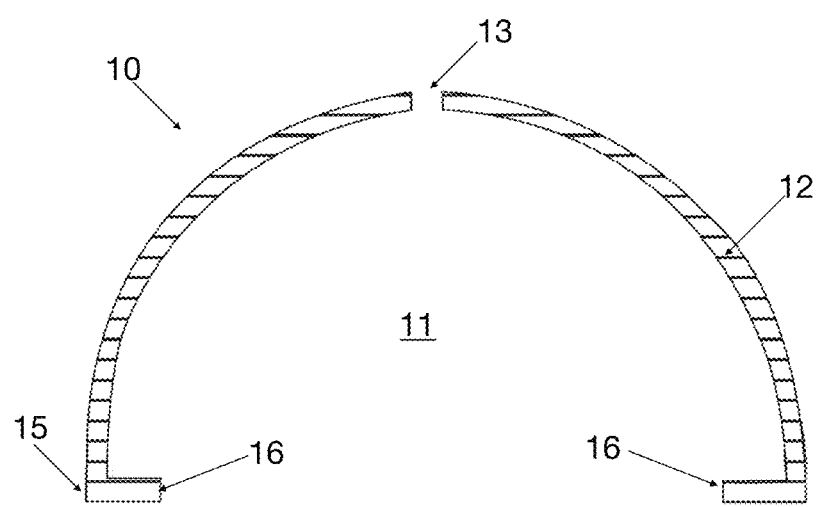
FIG. 3 shows a sectional elevation of the flexible body of the device.

Now, taking FIG. 3 as a reference, the flexible body (10) is formed by a semi-spherical membrane (12), with an upper circular access opening (13) for filling the inner chamber (11) with viscous fluid. It comprises a lower edge (15) with an interior perimeter projection (16) in a flat ring shape. This container flexible body (10) is made of silicone elastomer with characteristics of high elasticity and resistance.

Figure 4:
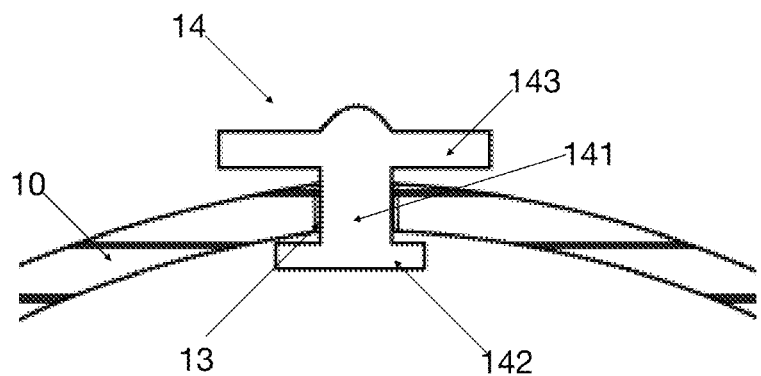
FIG. 4 shows a sectional elevation of the detail of the device closure element.

As illustrated in more detail in FIG. 4, the anti-leak closure element (14) comprises a central stem area (141) with a diameter greater than the circular opening (13) for access to the flexible body (10), a rounded lower projection (142) with a diameter even larger than the stem (141), and an upper projection (143) in a rounded disk shape with a diameter greater than the diameter of the lower projection (142). It is made of harder material than the flexible container (10) but is equally elastomeric.

Figure 5:
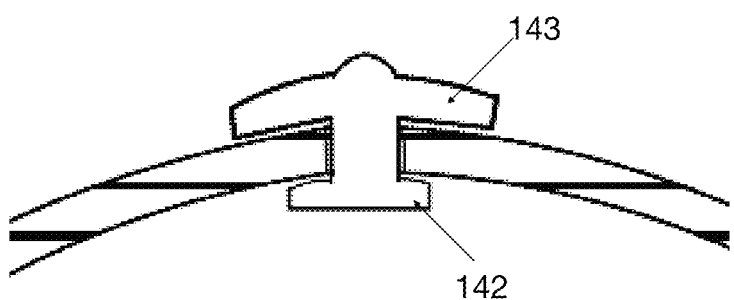
FIG. 5 shows a sectional elevation of the detail of one embodiment of the device closure element.

In an alternative embodiment, as exemplified in FIG. 5, the upper projection (143) of the anti-leak closure element (14) is slightly curved downwards, describing a curved truncated cone shape while the lower projection (142) also describes a convex curvature at least on its upper face (144).

Figure 6:
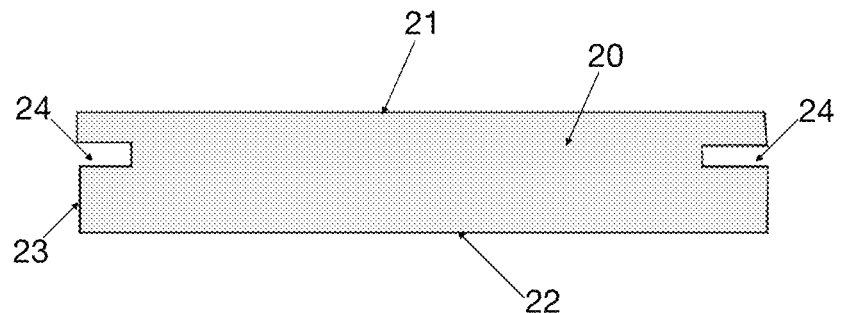
FIG. 6 shows a sectional elevation of the device platform.

On the other hand, the aforementioned support and transfer platform (20), as illustrated in FIG. 6, comprises a solid body formed by an upper surface (21) parallel to a lower surface (22) and an outer mantle (23) with means to retain the flexible body. Where said means for retaining the flexible body comprise a perimeter groove (24) made around the entire perimeter of the mantle (23).

Figure 7:
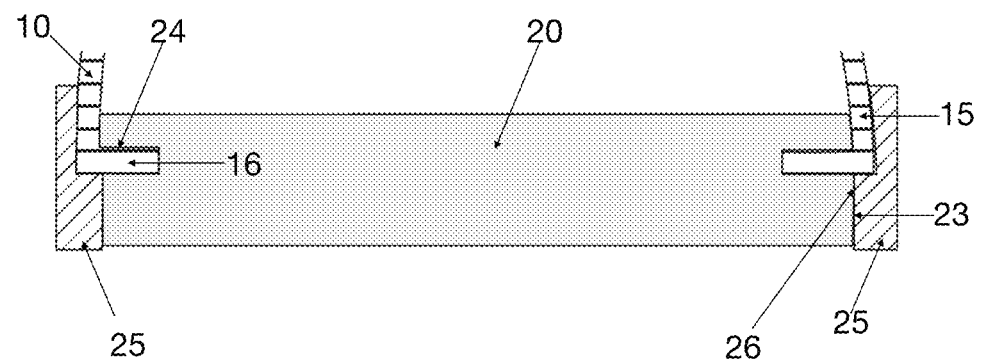
FIG. 7 shows a sectional elevation of the device platform joined to the flexible body.

As shown in FIG. 7, the perimeter groove (24) of the platform (20) comprises a depth which matches the width and thickness of the inner perimeter projection (16) of the container flexible body (10) where said projection (16) is inserted into the groove (24). The means for retaining the flexible body also include an outer perimeter seal ring (25) which has a stepped inner face (26) that abuts outside the mantle (23) of the platform (20) and retains the lower edge (15) of the flexible body (10) with the inner projection (16) inserted into the groove (24).

Figure 8:
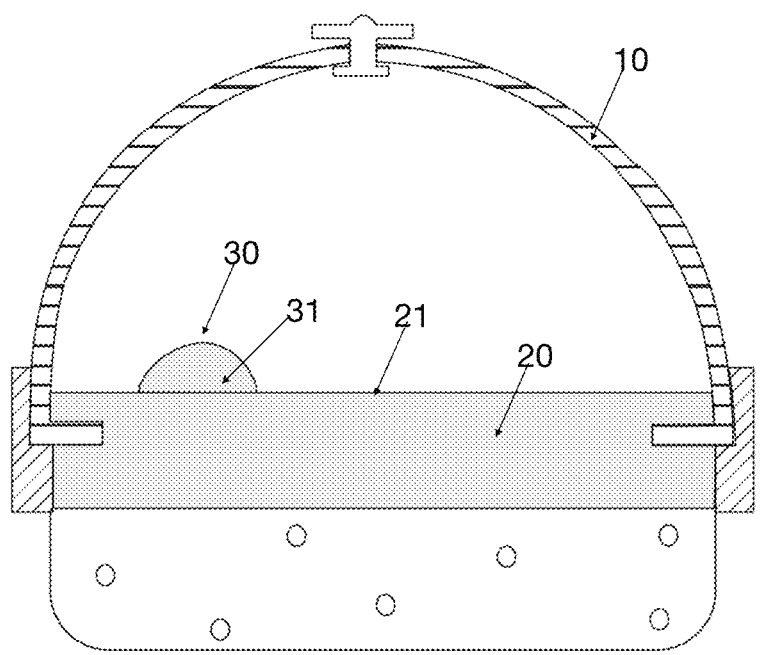
FIG. 8 shows a sectional front elevation of the device where the simulating means of a tumor can be seen.

Taking FIG. 8 as a reference, the aforementioned means to simulate (30) a type of abnormal tissue comprise at least one smaller body with a shape and size similar to a tumor (31) made of a harder and firmer material than the material of the container flexible body (10); it has a preferably semi-spheroidal shape with an irregular surface and is fixedly located on the upper surface (21) of the platform (20).

Figure 9:
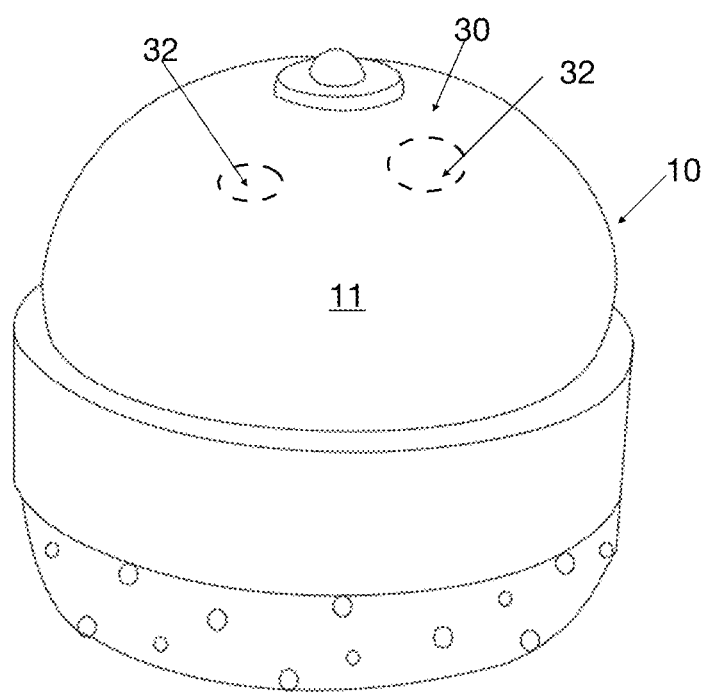
FIG. 9 shows an upper isometric view of the device with another type of means to simulate abnormal tissue.

In an alternative embodiment, as illustrated in FIG. 9, the means to simulate (30) a type of abnormal tissue may also comprise at least one smaller body with a shape and size similar to a cyst (32) or benign tumor made of a material similar to that of the flexible container body, preferably spheroidal in shape with soft walls and is found loosely inside the chamber (11) of the container flexible body (10).

Figure 10:
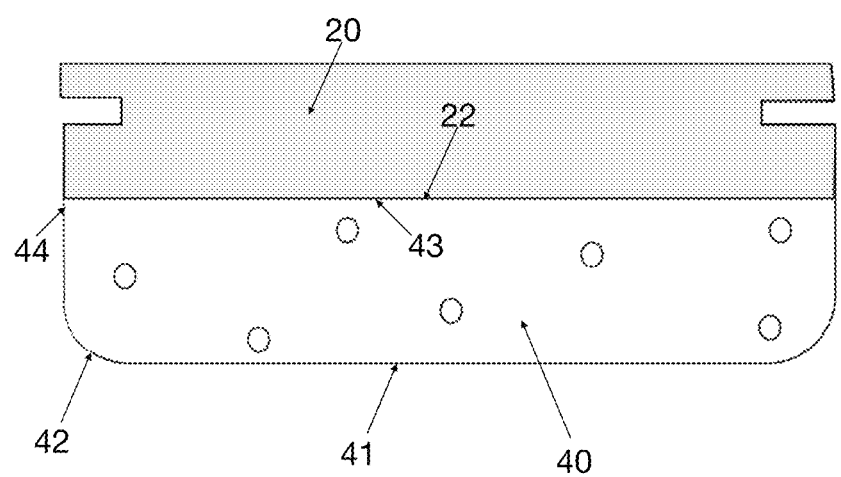
FIG. 10 shows a sectional front elevation of the joint between the platform and the viscous fluid distributor element.

Now, with respect to the aforementioned viscous fluid distributor element (40), as shown in FIG. 10, it comprises a body of absorbent and spongy material, preferably cylindrical in shape and not very high with a flat outer face (41) of rounded edge (42) and an inner flat face (43) with a straight edge (44). It is joined by its inner flat face (43) to the lower surface (22) of the platform (20) and has a diameter that matches the diameter of the platform (20). Being this distributor element (40), preferably a soft sponge.

Figure 11:
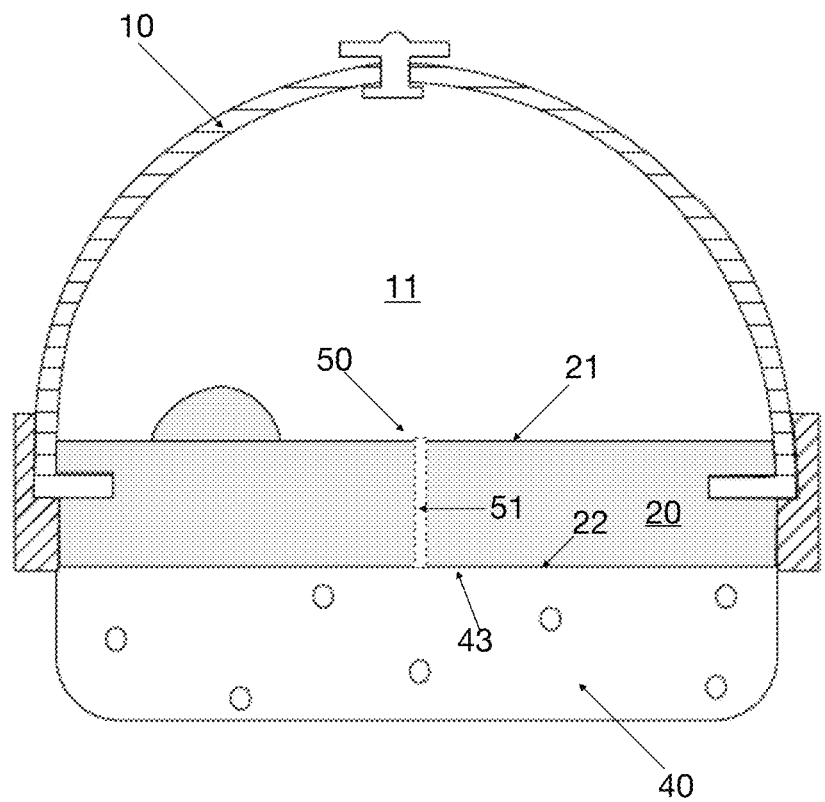
FIG. 11 shows a sectional front elevation of the device incorporating the fluid transfer means.

With reference to FIG. 11, the transfer means (50) that allow the transfer of the viscous fluid from the chamber (11) to the distributor element (40) comprise at least one through opening (51) that extends from the upper surface (21) to the lower surface (22) of the platform (20) to arrive at the inner flat face (43) of the distributor element (40). The viscous fluid is preferably liquid soap.

Figure 12:
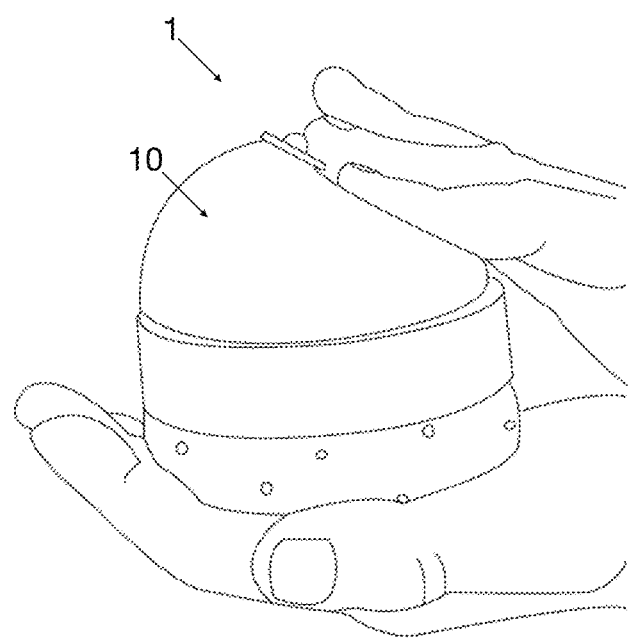
FIG. 12 shows an ambient perspective showing the use of the device as a training tool.

Once the flexible body (10) is filled with the viscous fluid, as for example, filled with liquid soap directly from its container through the opening of the flexible body, the user can hold the device (1) in one of her hands, as illustrated in FIG. 12, while with the other hand she performs the palpation training on said flexible body (10) pressing with his fingers until she can distinguish the presence of a tumor inside it.

Figure 13:
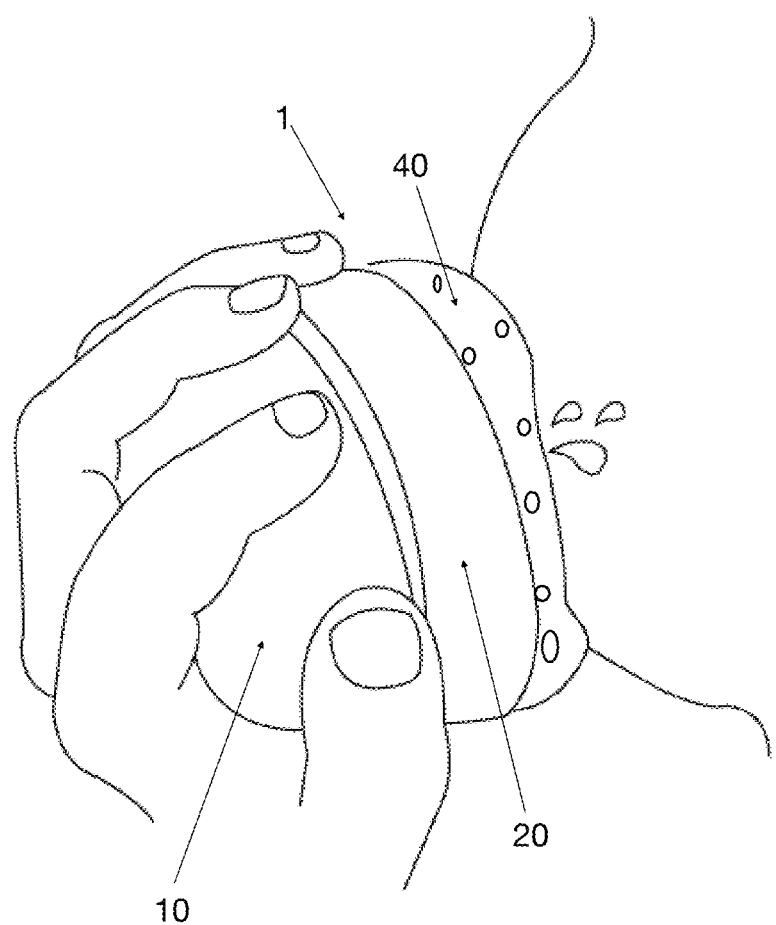
FIG. 13 shows a set perspective showing the use of the device as a tool to apply and distribute a viscous fluid on the skin of the breast before performing a breast self-examination.

While the training is being carried out, the same pressure of the fingers on the flexible body (10) generates that a discreet amount of fluid (soap) has been transferred to the distributor element (40), so that once the session of training is finished, the user can spread the fluid on her own breast, as illustrated in FIG. 13, where the same flexible body (10) can be used as a support element that is comfortably adapted to the concavity of the hand while that the platform (20) gives the necessary rigidity to handle the device (1) and press it slightly to generate foam in the distributor element (40).

Figure 14:
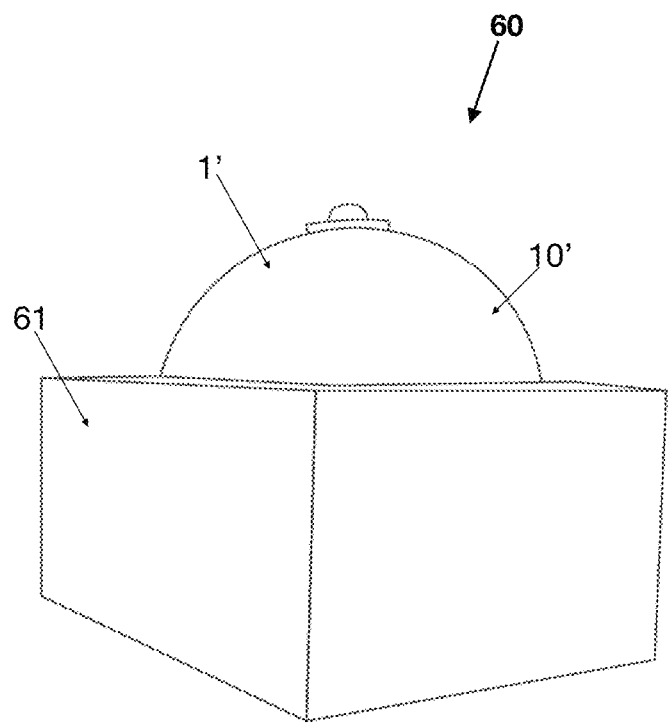
FIG. 14 shows a perspective view of the kit including the device and the packaging in closed state.

As shown in FIG. 14, the disclosure also includes a training kit (60) to teach and learn breast self-examination techniques for early detection of breast cancer, which allows its use at home, provides means to perform self-examination itself in a real way, facilitates the formation of a self-examination habit. It comprises the training device (1') described above, which is formed by a container flexible body that can be filled with a viscous fluid, a support and transfer platform connected to the flexible body to define an interior chamber, means to simulate at least one type of abnormal tissue detectable inside the container flexible body; a fluid distributor element directly on the user's skin coming from the chamber and transfer means arranged on the platform that allow the transfer of said fluid from the chamber to the distributor element; and also includes a package (61) containing the device (1') that includes information with instructions for use, information on how to fill the flexible body (10') on palpation training with the device (1') and instructions on how to perform the self-palpation exam on the user's own breasts.

Figure 15:
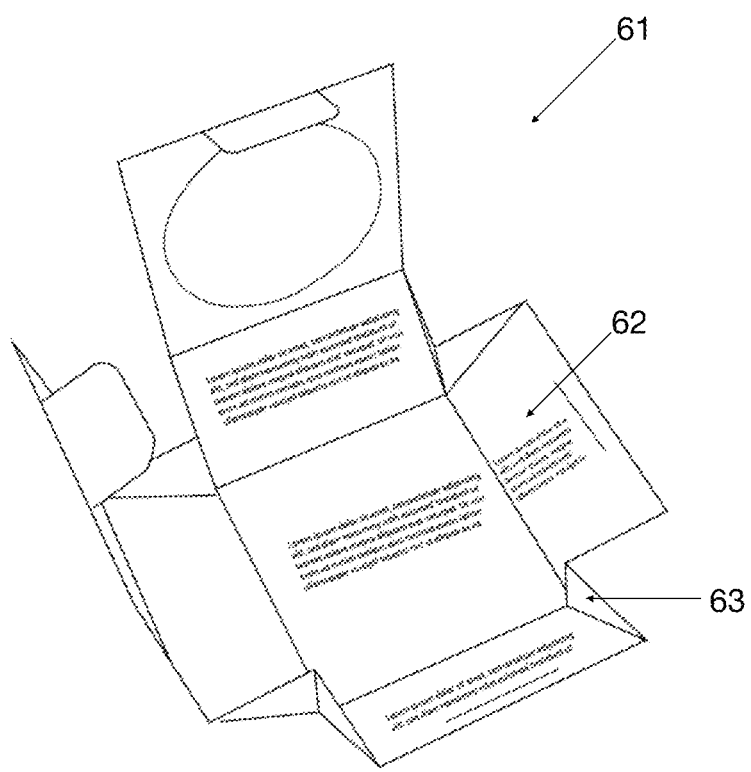
FIG. 15 shows a perspective view of the packaging in the open unfolded state.

In reference to FIG. 15, the packaging (61) comprises an inner face (62) where the information is placed; it allows to be opened and unfolded safely without breaking its faces thanks to the fact that the vertical edges (63) of the packaging are of the type folded in bellows. The packaging 61 may also comprise graphic information in the form of a fillable table or calendar and is preferably made of cardboard laminated with a waterproof film.

The invention claimed is:

1. A device for training and direct practice of breast self-palpation techniques for early detection of breast cancer, which allows learning to distinguish abnormal tissue, allows its use at home, provides means to perform the self-examination itself in a real way and facilitates the formation of a self-palpation habit, wherein the device comprises a container flexible body refillable with a viscous fluid; a support and transfer platform connected to the flexible body to define an inner chamber where the viscous fluid is contained; means for simulating at least one type of detectable abnormal tissue within the container flexible body; a distributor element of the fluid directly on the user's skin coming from the chamber; and transfer means arranged on the platform that allow the transfer of said fluid from the chamber to the distributor element.

2. The device according to claim 1, wherein the container flexible body has the shape and size of a breast, it is formed by a semi-spherical membrane, with an upper circular access opening for filling the inner chamber with a viscous fluid comprising an anti-leak closure element that simulates the shape of a nipple;
   wherein the anti-leak closure element is made of a harder material than the flexible container but is equally elastomeric and comprises a central stem area of diameter greater than the circular access opening, a rounded lower projection with a diameter even greater than the stem, and an upper projection in a rounded disc shape with a diameter greater than the diameter of the lower projection; and
   wherein the upper projection of the anti-leak closure element is slightly curved downwards describing a curved truncated cone shape.

3. The device according to claim 1, wherein the container flexible body comprises a lower edge with an inner perimeter projection in a flat ring shape.

4. The device according to claim 1, wherein the container flexible body is made of silicone elastomer with characteristics of high elasticity and resistance.

5. The device-according to claim 1, wherein the support and transfer platform comprises a solid body formed by an upper surface parallel to a lower surface and an outer mantle with means to retain the flexible body; and
   wherein the means for retaining the flexible body comprise a perimeter groove made around the entire perimeter of the mantle and an outer perimeter seal ring.

6. The device according to claim 4, wherein the perimeter groove comprises a depth that matches the width and thickness of the inner perimeter projection of the lower edge of the container flexible body where said projection is inserted into the slot, or wherein the outer perimeter seal ring has a stepped inner face that abuts outside the mantle of the platform and retains the lower edge of the flexible body with the inner projection inserted into the groove.

7. The device-according to claim 1, wherein the means to simulate a type of abnormal tissue comprises at least one smaller body with a shape and size similar to a tumor made of a material harder and firmer than the material of the container flexible body;
   wherein said simulated tumor preferably has a semi-spheroidal shape with an irregular surface and;
   wherein said simulated tumor is fixedly located on the upper surface of the platform.

8. The device according to claim 1, wherein the means to simulate a type of abnormal tissue also comprise at least one smaller body with a shape and size similar to a cyst or benign tumor made of a material similar to that of the container flexible body-, wherein said body similar to a cyst has a spheroidal shape with soft walls and is found loosely inside the chamber of the container flexible body.

9. The device according to claim 1, wherein the distributor element of the viscous fluid comprises a body of absorbent and spongy material, preferably cylindrical in shape not very high with a flat outer face with a rounded edge and a flat inner face with a straight edge;
   wherein said distributor element is joined by its inner flat face to the lower surface of the platform; and
   wherein said distributor element has a diameter that matches the diameter of the platform.

10. The device according to claim 9, wherein the distributor element is a soft sponge.

11. The device according to claim 1, wherein the transfer means that allow the transfer of the viscous fluid from the chamber to the distributor element comprise at least one through opening that extends from the upper surface of the platform with the inner flat face of the distributor element.

12. The device according to claim 11, wherein the viscous fluid is a liquid soap.

13. A training kit to teach and learn breast self-examination techniques for early detection of breast cancer which allows its use at home, provides means to perform self-examination in a real way, facilitates the formation of a self-palpation habit, wherein the kit comprises a training device, comprising a container flexible body refillable with a viscous fluid, a support and transfer platform connected to the flexible body to define an inner chamber, means for simulating at least one type of detectable abnormal tissue within the container flexible body; a fluid distributor element directly on the user's skin coming from the chamber and transfer means arranged on the platform that allow the transfer of said fluid from the chamber to the distributor element; and a package containing the device that includes information with instructions for use, information on how to fill the flexible body on palpation training with the device and instructions on how to perform the self-palpation examination on the user's own breasts.

14. The training kit according to claim 13, wherein the package comprises an inner face where the information is arranged, and
   wherein the vertical edges of the packaging are of the type folded in bellows.

15. The training kit according to claim 13, wherein the package comprises graphic information in the form of a fillable table or a calendar; and
   wherein said packaging is made of cardboard laminated with a waterproof film.

* * * * *